(12) United States Patent
Singh et al.

(10) Patent No.: US 12,321,351 B1
(45) Date of Patent: Jun. 3, 2025

(54) MULTI-AGENT DATA ASSET SYNTHESIS SYSTEM

(71) Applicant: IQVIA Inc., Parsippany, NJ (US)

(72) Inventors: Sunil Kumar Singh, Kerala (IN); Raja Shankar, Kenilworth (GB); Arpit Rajauria, Rajasthan (IN); Shaktidhar Reddy Pullagurla, Telangana (IN); Sherry Mangla, Haryana (IN); Joe Joseph, London (GB)

(73) Assignee: IQVIA Inc., Parsippany, NJ (US)

( * ) Notice: Subject to any disclaimer, the term of this patent is extended or adjusted under 35 U.S.C. 154(b) by 0 days.

(21) Appl. No.: 19/001,865

(22) Filed: Dec. 26, 2024

(51) Int. Cl.
  *G06F 16/2453* (2019.01)
  *G06N 7/01* (2023.01)

(52) U.S. Cl.
  CPC .. *G06F 16/24542* (2019.01); *G06F 16/24532* (2019.01); *G06N 7/01* (2023.01)

(58) Field of Classification Search
  CPC ........ G06F 16/24542; G06F 16/24532; G06N 7/01
  See application file for complete search history.

(56) References Cited

U.S. PATENT DOCUMENTS

| | | | | |
|---|---|---|---|---|
| 2018/0173753 | A1* | 6/2018 | Pei | G06F 16/2453 |
| 2024/0086577 | A1* | 3/2024 | Zhang | G06F 21/6263 |
| 2024/0419747 | A1* | 12/2024 | Kallman | G06F 40/40 |

OTHER PUBLICATIONS

Cheng et al., Exploring Large Language Model based Intelligent Agents: Definitions, Methods, and Prospects, cs.AI, Submitted on Jan. 7, 2024, arXiv:2401.03428v1, 55 pages.
[No Author Listed] [online], "What's next for AI agentic workflows ft. Andrew Ng of AI Fund," Presented at Sequoia Capital's AI Ascent, Mar. 26, 2024, retrieved on Jan. 2, 2025, retrieved from URL <https://www.youtube.com/watch?v=sal78ACtGTc>, 5 pages with machine transcript.

\* cited by examiner

*Primary Examiner* — Cam Y T Truong
(74) *Attorney, Agent, or Firm* — Fish & Richardson P.C.

(57) ABSTRACT

Methods, systems, and apparatus, including computer programs encoded on a computer storage medium, for generating an execution plan for a request that involves accessing and synthesizing data assets from siloed data repositories. In one aspect, a method comprises receiving a first request, generating a request execution plan comprising (i) a sequence of second requests and (ii) a respective indicator of a relationship between a corresponding response for each second request and an overall response to the first request by processing the first request using a request planner artificial intelligence (AI) neural network agent, sequentially, assigning and providing each second request in the sequence of second requests to a particular retriever AI neural network agent in accordance with metadata corresponding with a particular data repository, obtaining the corresponding response to the second request, and generating the overall response to the first request using a synthesizer AI neural network agent.

20 Claims, 6 Drawing Sheets

MULTI-AGENT DATA ASSET SYNTHESIS SYSTEM

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations that can generate an execution plan for a request that involves accessing and synthesizing data assets from siloed data repositories. In this specification, a data asset refers to a specific data content item that is stored in a data repository. In this case, the system has access to multiple data repositories that are siloed, e.g., isolated, from other data repositories.

In particular, the system of this specification provides a number of artificial intelligence neural network agents that each can be tasked with an aspect of accessing and synthesizing a number of data assets stored across siloed data repositories as part of responding to a request. In this specification, an artificial intelligence neural network agent (AI NN) agent is an artificial intelligence implemented as a neural network that can be employed to perform a specific task, e.g., a data asset planning, access, or synthesis task.

According to a first aspect there is provided a method for receiving a first request, generating a request execution plan including (i) a sequence of second requests based on the received first request and (ii) a respective indicator of a relationship between a corresponding response for each second request and an overall response to the first request by processing the first request using a request planner artificial intelligence (AI) neural network agent, assigning each second request to a particular retriever AI neural network agent based on the sequence of second requests, sequentially, for each second request in the sequence of second requests, providing, to the particular assigned retriever AI neural network agent, a first input including the second request with an instruction to generate the corresponding response to the second request, the particular assigned retriever AI neural network agent having been assigned in accordance with metadata corresponding with a particular data repository, wherein the particular retriever AI neural network agent is selected from a set of retriever AI neural network agents that have each been finetuned on at least a respective data retrieval strategy task for a respective data repository using data in the respective data repository, obtaining the corresponding response to the second request, and generating the overall response to the first request by processing a second input including the first request, the sequence of second requests with respective corresponding responses, and the respective indicators of the relationships between the respective corresponding responses and the overall response using a synthesizer AI neural network agent with an instruction to synthesize the respective corresponding responses based on the first request.

In an example implementation, the request execution plan further includes (iii) one or more third requests and (iv) an additional respective indicator of a relationship between a corresponding response for each third request and an overall response to the first request, wherein the one or more third requests can be executed in parallel with at least one second request of the sequence of second requests, and wherein the second input further includes the responses to the one or more third requests and the additional respective indicators of the relationships between the corresponding responses for each third request and the overall response to the first request.

In an example implementation, generating the request execution plan using the request planner AI neural network agent further includes obtaining respective metadata for each data repository that has been used to finetune a retriever AI neural network agent in the set of retriever AI neural network agents, processing a third input that includes the first request, the respective metadata for each data repository, and a set of one or more example second requests using the request planner AI neural network agent with an instruction to generate the sequence of second requests and corresponding respective indicators by decomposing the first request according to the respective metadata for each data repository.

In an example implementation, the method further includes determining an order of execution for the request execution plan by generating data representing a directed acyclic graph (DAG), wherein the directed acyclic graph includes a set of nodes and a set of edges, and wherein: each node in the set of nodes represents a second request in the sequence of second requests, and each edge in the set of edges connects a respective pair of nodes in the DAG and represents an ordering between a first request and a second request corresponding to the respective pair of nodes.

In an example implementation, assigning the second request to the particular retriever AI neural network agent includes processing the second request using an agent classifier model.

In an example implementation, providing the first input to the particular retriever AI neural network agent includes processing the first input using the retriever AI neural network agent, or submitting the first input to a second system for processing using the retriever AI neural network agent.

In an example implementation, the method further includes maintaining a record of the obtained corresponding responses for each of the one or more second requests.

In an example implementation, the first input further includes one or more obtained corresponding responses generated for any previous second requests in the sequence of second requests.

In an example implementation, rephrasing the second request using the one or more obtained corresponding responses generated for any previous second requests, wherein rephrasing includes processing the second request and the one or more obtained corresponding responses using a rephrasing AI neural network agent to generate a rephrased second request, wherein the rephrased second request replaces the second request and the one or more obtained corresponding responses in the first input.

In an example implementation, in response to an indication that the corresponding response does not satisfy a criterion, obtaining the record of the one or more obtained corresponding responses, and providing the record of the one or more obtained corresponding responses to the particular retriever AI neural network agent.

In an example implementation, receiving the first request further includes determining whether the first request satisfies a request specification criterion, wherein the request specification criterion is indicative of the specificity and detail of the first request, and in response to determining that the request does not satisfy the request specification criterion, using a refiner AI neural network agent to prompt a user that submitted the first request to provide sufficient specificity and detail for the first request.

In an example implementation, the particular retriever AI neural network agent generates one or more variations of the second request that are each used for the respective data retrieval task.

In an example implementation, the particular retriever AI neural network agent is a structured data retriever AI neural network agent that generates the corresponding response using a relational table that includes one or more rows and a set of columns through operations including identifying a relevant subset of the set of columns using the second request, querying the respective data repository to generate a view of the table corresponding with the relevant subset of the set of columns, and identifying one or more rows of the view of the table relevant to answering the second request.

In an example implementation, the particular retriever AI neural network agent is an unstructured data retriever AI neural network agent that generates the corresponding response through operations including generating a request embedding of the second request by processing the request using an embedding neural network, determining respective measures of similarity between the request embedding and document embeddings in the respective data repository, wherein the document embeddings have been generated using the embedding neural network, and selecting N documents from the respective data repository using the measures of similarity.

In an example implementation, the method further includes using a plurality of unstructured data retriever AI neural network agents to each select N documents from the respective data repository in accordance with a respective data retrieval strategy, aggregating each of the selected N documents into a plurality of selected documents, ranking the plurality of selected documents, and selecting N documents from the ranked plurality of selected documents.

In an example implementation, the set of retriever AI neural network agents corresponds with a configuration of a second system that submitted the request.

In an example implementation, generating the overall response includes generating a report that includes citations using the synthesizer AI neural network agent.

In an example implementation, each citation indicates a reference to data in the respective data repository that was used to generate the corresponding response used to generate content in a portion of the report corresponding with the citation.

In an example implementation, each citation indicates a reference to a particular retriever AI neural network agent and sub-request used to generate content in a portion of the report corresponding with the citation.

In an example implementation, the instruction to synthesize the respective corresponding responses based on the first request further includes an instruction to prioritize portions of corresponding responses with citations to data that satisfies a data importance criterion.

In an example implementation, one or more of the request planner AI neural network agent, the set of retriever AI neural network agents, or the synthesizer AI neural network agent are language processing neural network agents including a set of parameter values.

In an example implementation, each AI neural network agent of the language processing neural network agents has been finetuned through operations including receiving a first reward for the output of the AI neural network agent, receiving a second reward for the overall response generated using the output of the AI neural network agent, updating one or more of the parameter values of the set of parameter values of the AI neural network agent based at least on the first and second rewards.

In an example implementation, obtaining the first reward and the second reward from the user.

In another aspect, there is provided a system comprising one or more computers and one or more storage devices storing instructions that are operable, when executed by the one or more computers, to cause the one or more computers to perform the method of any one of the example implementation methods described.

In another aspect, there is provided a computer storage medium encoded with a computer program, the program comprising instructions that are operable, when executed by data processing apparatus, to cause the data processing apparatus to perform the method of any one of the example implementation methods described.

Particular embodiments of the subject matter described in this specification can be implemented so as to realize one or more of the following advantages.

Generally, data assets sourced from siloed data repositories can be difficult to integrate and synthesize. In particular, unifying data assets stored across the siloed data repositories can be difficult due to incompatible data formats or storage structures, a lack of standardized metadata, and/or inconsistent data quality issues. Furthermore, accessing different data repositories can present challenges, since there are likely different data access protocols for each data repository, access latency differences, and data maintenance peculiarities that can complicate the synthesis of data sourced from siloed data repositories.

In contrast, the system of this specification can unify disparate data sets stored in siloed data repositories in a meaningful way with respect to a request to complete a complex task that cannot be answered with a single data repository and that instead involves synthesizing data from a variety of data sources. In particular, the system can utilize a number of AI NN agents that are each specialized in respective data planning, retrieval, or synthesis tasks to determine and distribute sub-requests corresponding to a complex multi-asset data synthesis request. By distributing the tasks amongst a number of specialized AI NN agents, the system is able to more efficiently and effectively generate a response to the request, e.g., relative to a system with a single AI NN agent.

For example, the system can receive a request, and can process the request using a request planner AI NN agent to generate a request execution plan including a sequence of sub-requests and the relationship between a corresponding response for each request and an overall response to the first request, e.g., including any dependencies between sub-requests. More specifically, the system can reflect any inter-dependencies between responses to sub-requests, e.g., how the response to a particular sub-request can depend on a response to a previous sub-request, as part of the request execution plan. The system can also identify whether any sub-requests can be executed concurrently.

The system can provide each of the sub-requests as input to an assigned retriever AI NN agent. The retriever AI NN agents can access data from a number of data repositories to generate a corresponding response to each sub-request in the sequence of sub-requests. In the case that any of the sub-requests can be executed concurrently, the system can provide inputs to assigned retriever AI NN agents in parallel, thereby reducing the computational resources necessary to execute the sub-requests relative to serially executing each request. The system can then process each of the corresponding responses to the sub-requests using a synthesizer AI NN agent to generate an overall response to the request based on the relationships between the sub-requests. Thus, the system is able to utilize a number of AI NN agents to unify and synthesize data assets from siloed data repositories to complete a multi-asset data synthesis request.

Moreover, the system is able to perform the multi-asset data synthesis request more efficiently than a team of humans, while still producing a comparably useful result. Multi-asset data synthesis requests are typically handled by a team of data scientists, consultants, and subject matter experts, who work in concert to identify and unify different data assets from different siloed data repositories in a meaningful way. Results from an example implementation of the system illustrate that the system-generated plans achieve high performance results, despite being generated in a fraction of the time, e.g., six minutes on average, compared to the human-generated ones, e.g., which take about four weeks of collaborative effort from the team.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
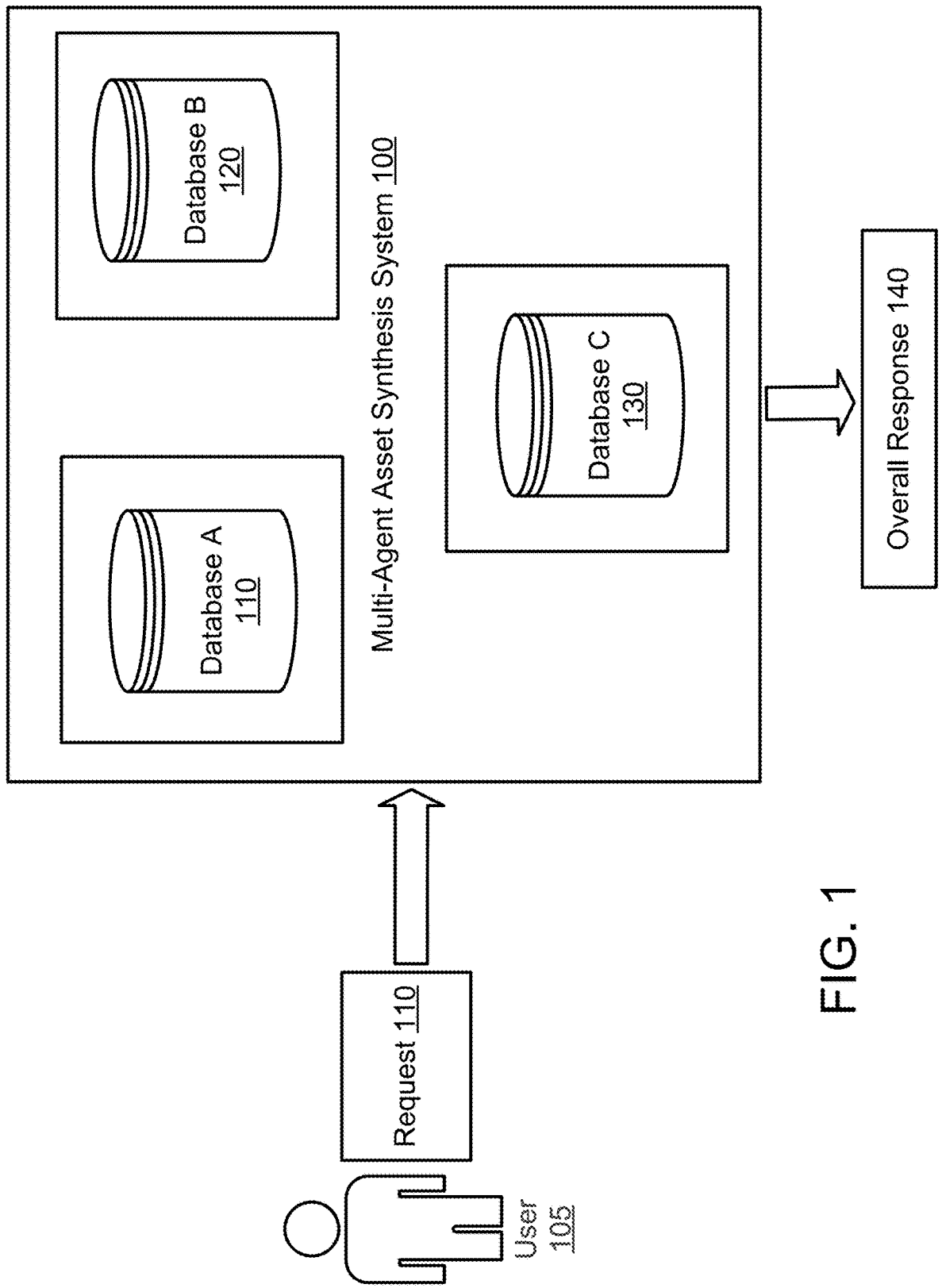
FIG. 1 provides an overview of how an example multi-agent data asset synthesis system can generate an overall response to a request using siloed data repositories.

FIG. 1 provides an overview of an example multi-agent data asset synthesis system 100. In particular, the system 100 can receive a request 110 from a user. In this case, the request 110 can be a multi-asset data synthesis request, e.g., a directive instruction for a task that relates to one or more data assets that are stored across the siloed data repositories, e.g., database A 110, database B 120, and database C 130.

Generally, data assets sourced from siloed data repositories can be difficult to integrate and synthesize. In particular, unifying data assets stored across the siloed data repository can be difficult due to incompatible data formats or storage structures, e.g., a SQL vs. a NoSQL structure, a lack of standardized metadata, and inconsistent data quality issues. Furthermore, accessing different data repositories can present challenges, since there are likely different data access protocols for each data repository, e.g., no standard applied-programming interface, and some of the data repositories may be stored in the cloud, while others may be stored on-premise, thereby introducing latency issues. Moreover, a lack of coordination among different groups that manage different data repositories can lead to redundancies that can be hard to identify and specific peculiarities that can complicate the synthesis of data sourced from multiple different repositories.

As opposed to performing the request 110 to identify and synthesize data assets from multiple sources using a team of data scientists, consultants, and subject matter experts, which can take a lot of time and is prone to normal human error, the system 100 can provide a number of artificial intelligence neural network (AI NN) agents to efficiently and effectively generate and provide a response to the request 110. In this context, an AI NN agent refers to an artificial intelligence implemented as a neural network that can be employed to perform a specific task.

More specifically, the system can utilize a number of AI NN agents to generate a cohesive response 140 to the request 110 that involves data assets stored across the siloed data repository. In particular, the system 100 can partition the generation of the overall response 140 into one or more of a planning, access, or synthesis task, and can instruct specialized AI NN agents to perform each of the sub-tasks more effectively and efficiently than tasking a single AI NN agent or relying on a human team.

Figure 2:
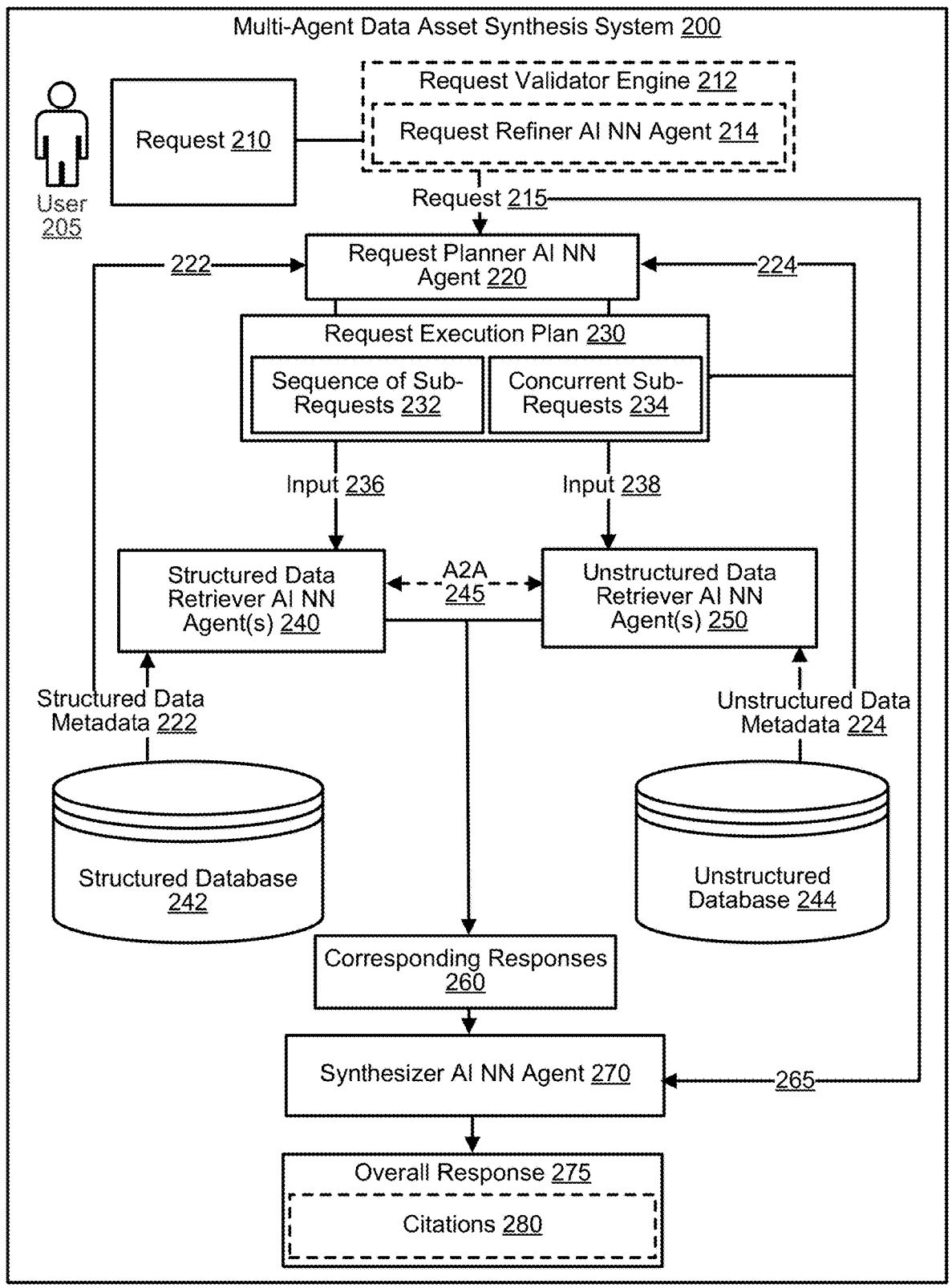
FIG. 2 is a system diagram of an example multi-agent data asset synthesis system.

FIG. 2 shows an example multi-agent data asset synthesis system 200. The multi-agent data asset synthesis system 200 is an example of a system implemented as computer programs on one or more computers in one or more locations in which the systems, components, and techniques described below are implemented. For example, the multi-agent data asset synthesis system 100 of FIG. 1 can be implemented as the multi-agent data asset synthesis system 200.

The multi-agent data asset synthesis system 200 includes one or more artificial intelligence neural network (AI NN) agents that can be used for processing a request 210 to generate an overall response 270 using one or more siloed data repositories. While only two data repositories are depicted in FIG. 2, the system 200 can include any number of data repositories, e.g., the structured database 242 and unstructured database 244 represent different examples of data repositories that can be included in the system 100 and accessed using a retriever AI NN agent, e.g., as will be described in more detail below.

For example, one or more of the AI NN agents can be planner AI NN agents tasked with planning how to execute the request 210 by accessing relevant data assets from the siloed data repositories to generate corresponding responses to sub-requests that relate to the request. As another example, one or more of the AI NN agents can be retriever AI NN agents tasked with synthesizing the corresponding responses into an overall response 275. In particular, the system 200 can use different retriever AI NN agents to generate corresponding responses for each sub-request. As yet another example, one or more of the AI NN agents can be synthesizer AI NN agents that can synthesize the corresponding responses to generate an overall response 275.

Each of the AI NN agents can have any appropriate a neural network architecture that can be configured for a specialized agent task. In particular, each AI NN agent can have any appropriate number of neural network layers (e.g., 1 layer, 5 layers, or 10 layers) of any appropriate type (e.g., fully-connected layers, attention layers, convolutional layers, etc.) connected in any appropriate configuration (e.g., as a linear sequence of layers, or as a directed graph of layers).

In an example implementation, one or more of the AI NN agents are generative neural networks, e.g., a generative-adversarial network or an autoregressive language processing network. As an example, an AI NN agent can have a recurrent neural network architecture that is configured to sequentially process the contents of an input and trained to perform next element prediction, e.g., to define a likelihood score distribution over a set of next elements. More specifically, an AI NN agent can be a recurrent neural network (RNN), long short-term memory (LSTM), or gated-recurrent unit (GRU). As another example, the AI NN agent can be transformer-based, e.g., an encoder-decoder transformer, an encoder-only transformer, or a decoder-only transformer, configured to perform parallel processing of the contents of the multimodal input using a multi-headed attention mechanism.

As a particular example, one or more of the AI NN agents can be a large language model. Large language models are language processing neural networks that have been demonstrated to achieve state of the art performance in semantic understanding, e.g., their ability to effectively capture semantic information from inputs. In this case, the input to the AI NN agent can include training data formulated as prompts, e.g., a directive instruction from a user, e.g., a question, statement, code snippet, or example.

For example, in the case that the AI NN agents are implemented as language processing neural networks, the AI NN agents can have been finetuned, e.g., using reinforcement learning. As an example, the system 200, or another system, can generate a first reward for the output of the AI NN agent, e.g., with respect to accuracy, appropriateness, completeness, response time, or reasoning, and can receive a second reward for the overall response generated using the output of the AI NN agent, e.g., as feedback from a user evaluating the overall response, and can update one or more of the parameter values of the set of parameter values of the AI NN agent based at least on the first and second rewards. Finetuning the AI NN agents with both first-level and overall response-level rewards can yield performance gains over overall response-level rewards alone.

In particular, the system 200 can receive a request 210, e.g., from a user 205. In another case, the system 200 can receive the request 210 from another system. The request 210 can be a natural language request that specifies a multi-asset data synthesis task, e.g., a complex task that cannot be answered with a single data repository and involves synthesizing data from a variety of data sources. As an example, the request 210 can be "I'm developing a market entry strategy for a pharmaceutical product in Southeast Asia. Could you provide an analysis of the competitive landscape and regulatory requirements within this market?" As another example, the request 210 can be "Analyze the impact of customer demographics based on purchases for a product following the marketing campaigns for the product from the last 10 years."

In some cases, the system 200 can process the request 210 with a request validator engine 212. In this case, the system 200 can evaluate whether the request 210 includes sufficient detail and specificity to be answered by the system 200, e.g., by determining whether the first request satisfies a request specification criterion. For example, the user 205 of the system 200 can configure the request specification criterion, e.g., to ensure that a request 210 is not too vague or is too ambiguous to be answered in a useful way.

In the case that the system 200 determines that the request 210 does not satisfy the request specification criterion, the system 200 can use a request refiner AI NN agent 214 to prompt the entity that submitted the request 210, e.g., the user 205 or another system, to clarify some aspect of the request 210. In particular, the system 200 can process the request 210 using the request refiner AI NN agent 214 to identify which aspects of the request 210 need additional detail or specificity. For example, in the case that the request refiner AI NN agent 214 is a large language model, the system 200 can prompt the request refiner AI NN agent 214 with an instruction to determine which aspect of the request 210 is insufficient with request to the request specification criterion. For example, in the case that the request 210 says "Explain how the consequences of how it will impact college professors and students hoping to contribute to the cause", the request refiner AI NN agent 214 can identify that the word "it" and "the cause" as ambiguous and can prompt the user 205 to define what "it" and "the cause" refer to in order to refine the request 210.

The system 200 can process the request 215, e.g., either the refined request or the original request 210, using a request planner AI NN agent 220 to generate a request execution plan 230 that can be executed by each of a number of retriever AI NN agents, e.g., the agents 240 and 250, which will be described in more detail below. The request execution plan 230 can include a sequence of sub-requests 232, e.g., based on an identification of sub-tasks that relate to data maintained in respective data repositories and can be completed as part of responding to the request 215, and an indicator of the relationship between a corresponding response to each sub-request and the overall response 275 to the request 215.

In particular, the relationships between the corresponding response to each sub-request and the overall response 275 can reflect any dependencies between sub-requests, e.g., that a corresponding response to a particular previously executed sub-request is a necessary input for the execution of a next sub-request in the sequence of sub-requests 232. More specifically, the ordering of the sequence of sub-requests 232 reflects dependencies between the sub-request execution. In some cases, the request planner AI NN agent can additionally identify concurrent sub-requests 234, e.g., that can be executed concurrently with at least one sub-request in the sequence of sub-requests 232. As an example, the request planner AI NN agent can determine the ordering of the sub-requests by generating data representing a directed acyclic graph (DAG), e.g., as will be described in more detail with respect to FIG. 3.

More specifically, the request planner AI NN agent 220 can process the request 215 and metadata from each of the siloed data repositories that the system 200 has access to, e.g., the system 200 can be configured to have access to a selected set of data repositories, to identify the sub-requests with respect to the data assets maintained within each of the siloed data repositories. For example, the structured data metadata 222 can include database schema information, e.g., table names, column names, data type, the identification of foreign keys and indices, etc., and the unstructured data metadata 224 can include key-value properties, document and sharding metadata, definitions of data represented by nodes and edges in a graph, etc.

As another example, the metadata 222 and 224 can include example sub-requests that can be answered using data that is maintained in a respective data repository, e.g., (example request, example sub-request) tuples for each of the data repositories that the system 200 has access to. In the case that the request planner AI NN agent 220 is implemented as a large language model, the system can process the examples in the metadata 222 and 224 as few-shot prompts for the request planner AI NN agent 220, e.g., in order to determine the sub-requests based on the example sub-requests that can be answered using data in a particular data repository.

In particular, the request planner AI NN agent 220 can determine the request execution plan 230 based on how the request 215 can be partitioned with respect to the data assets available in each of the siloed data repositories. As an example, the user 205 can control which data repositories the system 200 can access. As another example, the system 200 can be configured to access data repositories maintained by a different system. In the particular example depicted, the system 200 can obtain structured data metadata 222 from the structured database(s) represented by the structured database 242 and unstructured data metadata 224 from the unstructured database(s) represented by the unstructured database 244.

After determining the request execution plan 230, the system 200 can assign each of the sub-requests in the sequence of sub-requests 232 and the concurrent sub-requests 234 to a particular retriever AI NN agent, e.g., that has been finetuned to perform a data retrieval and generation task for a respective data repository. In some cases, the system 200 can assign the sub-requests 232 and 234 to particular retriever AI NN agents using a classification model, e.g., as will be described in more detail with respect to FIG. 3.

More specifically, each of the retriever AI NN agents are specialized at retrieval-augmented generation (RAG), e.g., retrieving one or more data assets from a data repository using a particular data retrieval strategy, and generating a corresponding response to the sub-request using the retrieved data. The data retrieval strategies can include but are not limited to techniques such as text-to-Python, text-to-SQL, text-to-graphQL, custom function calling, or applied program interface (API) calling. As an example, the system 200 can include structured data retriever AI NN agents 240 that have been trained on an indexed retrieval, materialized view, or pagination retrieval strategy. As another example, the system 200 can include unstructured data retriever AI NN agents 250 that have been trained on a key-based lookup, partial retrieval, sorted set retrieval, node lookup, or range query strategy.

The system 200 can assign the sub-request to a particular retriever AI NN agent and provide an input including the sub-request to the retriever AI NN agent for execution. In the particular example depicted, the system 200 can process an input using the retriever AI NN agents, e.g., in the case that the retriever AI NN agents 240 and 250 are included in the system 200. In other cases, the system 200 can submit the inputs 236 and 238 to a second system for processing using retriever AI NN agents that are included in the other system. In this case, the request planner AI NN agent 230 can receive metadata 222, 224 from, e.g., data repositories that the other system maintains.

In particular, the input for each retriever AI NN agent can include the assigned sub-request. The system 200 can then obtain the corresponding response to the sub-request from the particular retriever AI NN agent. More specifically, the system 200 can provide the input to a particular retriever AI NN agent based on the ordering of the sequence of sub-requests, e.g., in accordance with any dependencies between the sub-requests. In the case that the system 200 is assigning a concurrent sub-request to a particular retriever AI NN agent, e.g., a sub-request that can be executed at the same time as a sub-request in the sequence of sub-requests, the system 200 can provide the input to the particular retriever AI NN agent, e.g., concurrently with another input to a different retriever AI NN agent.

In the case that the system 200 assigns a sub-request to a structured data retriever AI NN agent 240, the system 200 can provide the assigned sub-request as input 236 to the structured data retriever AI NN agent 240 with an instruction to generate the corresponding response for the sub-request. In some cases, the structured data retriever AI NN agent 240 can also process the structured data metadata 222 for the particular data repository that the agent 240 is trained to retrieve data from, e.g., in order to generate multiple variations of the sub-request based on the repository metadata 222, as is described in more detail below.

As an example, the structured data retriever AI NN agent 240 can have been trained to generate the corresponding response to the sub-request in the input 236 by generating a temporary table view of a relational table. In particular, the structured data retriever AI NN agent 240 can identify a relevant subset of a set of columns using the sub-request and can query the structured database 242 to generate a view of the table corresponding with the relevant subset of the set of columns. Then, the structured data retriever AI NN agent 240 can identify one or more rows of the view of the table relevant to answering the sub-request. The structured data retriever AI NN agent 240 can then process the data relevant to answering the sub-request to generate a corresponding response.

In the case that the structured data retriever AI NN agent is an LLM, the structured data retriever AI NN 240 can generate code, e.g., Python analytics code, to generate a table view that is useful for answering the sub-request. For example, the structured data retriever AI NN agent 240 can identify the relevant information from the structured database 242 and can modify it in a useful format, e.g., by generating a pivot table, aggregating on a field based on conditional formulas, expanding a column that contains a list into multiple rows, etc. The structured data retriever AI NN agent 240 can then process the modified format data to generate a corresponding response to the sub-request.

In the case that the system 200 assigns a sub-request to an unstructured data retriever AI NN agent 244, the system 200 can provide the assigned sub-request as input 238 to the unstructured data retriever AI NN agent 250 with an instruction to generate the corresponding response for the sub-request. In some cases, the unstructured data retriever AI NN agent 250 can also process the unstructured data metadata 224 for the particular data repository that the agent 250 is trained to retrieve data from, e.g., in order to generate multiple variations of the sub-request based on the repository metadata 224 as will be described in more detail below.

As an example, the system 200 can provide the input 238 to an unstructured data retriever AI NN agent 250 that is configured to parse relevant unstructured documents for content related to the sub-request. For example, the unstructured data retriever AI NN agent 250 can have been trained to generate the corresponding response to the sub-request in the input 238 by determining respective measures of similarity, e.g., semantic similarity, between an embedding of the sub-request and data item embeddings, e.g., document embeddings, of data items in the unstructured database 244.

In particular, the unstructured data retriever AI NN agent 250 can generate a request embedding of the sub-request, e.g., using an embedding neural network. The unstructured data retriever AI NN agent 250 can obtain document embeddings of each of the documents in the unstructured database 244, e.g., by receiving the document embeddings from the database 244 or generating the document embeddings using the embedding neural network. The unstructured data retriever AI NN agent 250 can then select N documents, e.g., three, five, 10, etc., documents from the unstructured database 244 based on the measures of similarity. More specifically, the unstructured data retriever AI NN agent 250 can retrieve the N most similar documents corresponding with the top N measures of similarity. The unstructured data retriever AI NN agent 250 can then process the data relevant to answering the sub-request to generate a corresponding response.

In some cases, after receiving the sub-request, the retriever AI NN agent can generate variations of the sub-request, e.g., using the metadata 222 or 224, to ensure the retriever AI NN agent captures diverse interpretations in order to retrieve a broader range of relevant information using a particular data repository. In this case, the retriever AI NN agent can preprocess the sub-request, e.g., using text normalization, stop-word removal, or a paraphrasing or heuristics model, to generate the different variations of the sub-request that can be further processed using the retriever AI NN agent.

For example, a retriever AI NN agent can receive the sub-request "What are the health benefits of taking Vitamin D daily?" and can generate multiple sub-request variations, e.g., to search a particular data repository. As an example, the retriever AI NN agent can generate the rephrased variations: "Does daily consumption of Vitamin D improve health?" and "What are the nutritional advantages of taking Vitamin D regularly?" As another example, the retriever AI NN agent can generate additional variations: "How does taking Vitamin D every day affect health?" and "What are the positive effects of Vitamin D on human health?". After generating the multiple sub-request variations, the retriever AI NN agent can use each of the sub-request variations to identify data in the corresponding data repository using the data retrieval strategy that the retriever AI NN agent has been finetuned to perform.

In some cases, the system 200 can assign the same sub-task to a number of unstructured data retriever AI NN agents, e.g., each with a different retrieval strategy for the same unstructured database 244. In this case, the system 200 can provide the input 238 to each of the unstructured data retriever AI NN agents, e.g., with an instruction to select N respective documents from the database 244. The system 200 can then aggregate each of the selected N documents from the unstructured data retriever AI NN agents, can rank the aggregated selected documents, e.g., based on their respective measures of similarity, and can select the N documents from the aggregated documents.

In the particular example depicted, the dashed arrow between the structured data retriever AI NN agent(s) and the unstructured data retriever AI NN agent(s) 250 represents an agent-to-agent (A2A) communication protocol 245. For example, each of the retriever AI NN agents can retrieve relevant data and generate a corresponding response to a particular sub-request, and can communicate the response to the particular sub-request to other retriever AI NN agents, e.g., other retriever AI NN agents that are assigned sub-requests after the particular sub-request in the sequence of sub-requests 232. In the case that a sub-request depends on the response to a previous sub-request, the system 200 can provide a communication channel between the AI NN agents, e.g., in order to transmit the relevant information from the corresponding response generated by a first retriever AI NN agent as input to a second retriever AI NN agent. In particular, in some cases, the system 200 can rephrase one or more of the following sub-requests based on corresponding responses for previously executed sub-requests in the sequence of sub-requests 232. An example agent-to-agent communication protocol for rephrasing requests will be described in more detail with respect to FIG. 4.

The system 200 can obtain each corresponding response to a sub-task, e.g., from one or more of the structured data retriever AI NN agent(s) 240 and the unstructured data retriever AI NN agent(s) 250. After obtaining the respective corresponding responses for each of the sequence of sub-requests 232 and concurrent sub-requests 234, the system 200 can aggregate each corresponding response to generate the corresponding responses 260. The system 200 can then process the corresponding responses 260 and the request execution plan 230, e.g., the sequence of sub-requests 232, concurrent sub-requests 234, and the respective indicators of the relationship between the respective corresponding response for each sub-request and the overall response, as input 265 to a synthesizer AI NN agent 270. In the case that the synthesizer AI NN agent 270 is a large language model, the system 200 can process the input 265 with an instruction to generate an overall response 275 by synthesizing the respective corresponding responses 260 based on the request 215.

In particular, the synthesizer AI NN agent 270 can use the relationships identified by the request planner AI NN agent 220 to synthesize each of the corresponding responses 260 in a meaningful way in order to generate an overall response 275 to the request 215. Thus, the system 200 is able to unify data assets from a number of siloed data repositories in order to generate a meaningful overall response 275.

As an example, the overall response 275 can be a textual content item. In particular, the overall response 275 can be a document, e.g., a report, that includes the information from each of the corresponding responses 260. In this case, the overall response 275 can include text and graphical outputs. As another example, the overall response 275 can include charts, tables, and pictures. In some cases, the overall response 275 can include an audio output, a movie output, or both. Further, this overall response 275 can be published and downloaded as a slide deck or a text document.

In some cases, the synthesizer AI NN agent 270 can be configured to include citations 280, e.g., to the particular retriever AI NN agent and sub-request that resulted in the content, or to one or more particular data assets that were retrieved from a particular data repository, in the overall response 275. For example, the synthesizer AI NN agent 270 can include a citation to reference the data that was used to generate a corresponding response that was used to generate a portion of the overall response 275. In this case, the system 200 can optionally instruct the synthesizer AI NN agent 270 to prioritize portions of corresponding responses with citations to data that satisfies a data importance criterion. As an example, in the case that one or more of corresponding responses 260 were generated using academic journal publications, the system 200 can instruct the synthesizer AI NN agent 270 to prioritize portions of corresponding responses from more reputable journal sources in the overall response 260.

The system 200 can then provide the response to the user 205 or to another system, e.g., for presentation or further downstream analysis. By distributing the planning, access, and synthesis of information retrieved from multiple siloed data repositories, the system 200 is able to efficiently and effectively generate an overall response 260 to a complex multi-asset synthesis request. An example comparison of the overall response 260 generated by the system 200 with respect to a response generated by an equivalent team of humans will be described in more detail with respect to FIG. 5.

For example, the system 200 can be used to answer a request 210 directed to unmet drug development needs in detecting and treating early breast cancer. In particular, the system 100 can receive the query "What is the unmet need in eBC?" as the request 210, and can refine the request using the validator engine 212 to prompt the user to refine the query to "What are the current gaps in treatment or research for early Breast Cancer?" as the request 115.

The request planner AI NN agent 220 can then process the request 215 and the structured and unstructured data metadata 222, 224 to determine a request execution plan 230 including sub-requests that can be assigned to different retriever AI NN agents. In this case, the request planner AI NN agent 220 can assign each sub-request to a retriever AI NN agent that has been trained on a respective data retrieval strategy with respect to a particular medical data repository, e.g., (i) an AI NN agent that retrieves articles directly from the PubMed database, (ii) an AI NN agent that performs a semantic search across the PubMed, PMC, and ClinicalTrials databases, (iii) an AI NN agent that performs a domain-restricted search engine to retrieve additional relevant resources, and (iv) an AI NN agent that directly queries the PubMed database to fetch abstracts of studies.

As an example, the (i) AI NN agent can use the request 215 to retrieve publications, and the (ii) AI NN agent can generate an intermediate semantic search query: "gaps in eBC treatments or research unmet needs" and use the intermediate semantic query to search the PubMed, PMC, and ClinicalTrials databases. As another example, the (iii) AI NN agent can use the request 215 to determine different search engine queries, e.g., "advances in eBC", "eBC treatment gaps", etc., and the (iv) AI NN agent can use the request 215 to query PubMed.

In some cases, after retrieving related data, the system 200 can use a retrieval-augmented-generation (RAG) fusion re-ranking agent to aggregate the data assets retrieved by all of the retriever agents as corresponding responses 260 and rank them using reciprocal rank fusion. In this case, the RAG fusion re-ranking agent can assign a score to each data asset d, e.g., using the formula:

$$RRF(D) = \sum_{i=1}^{N} \frac{1}{k + \text{rank}(d_i)}$$

where N is the number of ranked-lists being fused, i indexes over N, $d_i$ is the rank of the data asset in list i, and k is a fixed constant. Since the score is inversely proportional to the rank of the document in list i, the higher-ranked documents contribute more to the score. The system 200 can then rank the data asset based on the score assigned to each data asset.

The system 200 can then generate an overall response 275 by processing each of the corresponding responses 260 using the synthesizer AI NN agent 270. In the case that the responses 260 were ranked, e.g., using RAG fusion, the system 200 can select the N top-scoring data assets as the responses to be processed using the synthesizer AI NN agent 270. In particular, the system 200 can process the corresponding responses 260, or the N top-scoring data assets as responses, with the request 215, and an instruction to synthesize the responses based on the request 215, e.g., "Based on the provided context, summarize the unmet needs in early breast cancer.". For example, the system 200 can then generate and provide "The primary unmet needs in early breast cancer (eBC) include the integration of cost-effective genomic testing, better support for psychological impacts among survivors, and access to advanced therapies, particularly in low-income regions. Additionally, personalized treatment options for triple-negative and high-risk hormone receptor-positive patients remain a challenge." as the overall response 270.

Figure 3:
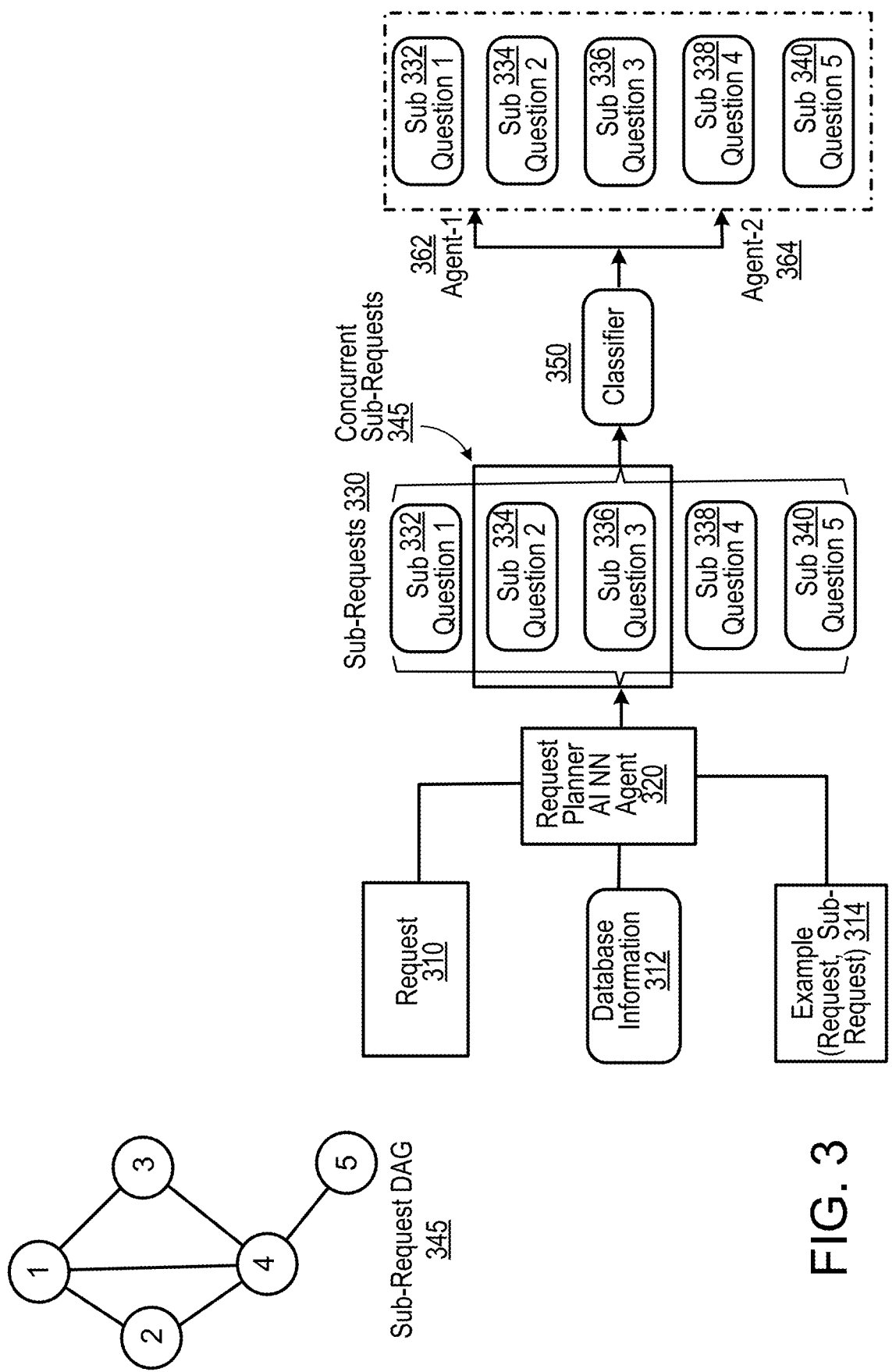
FIG. 3 is a block diagram demonstrating how a request planner agent identifies a sequence of sub-requests and assigns the sub-requests to different agents.

FIG. 3 is a block diagram demonstrating how a request planner agent identifies a sequence of sub-requests according to the ordering of a directed acyclic graph and assigns the sub-requests to different agents using a classifier model.

As described with respect to FIG. 2, the system can process a request 310 and data repository metadata, e.g., the database information 312 and example (request, sub-requests) tuples 314 for each data repository that the system 200 has access to. In this case, the database information 312 can include metadata specifying the structure in which the data is maintained in the repository, and the (request, sub-request) tuples can include example sub-requests that are answerable using the data in a particular data repository.

The request planner AI NN agent 330 can generate a request execution plan that includes a number of sub-requests 330 based on the request 310 and the relationship between corresponding responses to each of the sub-requests and the overall response (not depicted). In the particular example depicted, the request planner AI NN agent 320 has generated five sub-questions as the sub-requests 330 for the request 310, e.g., sub-question 1 332, sub-question 2 334, sub-question 3 336, sub-question 4 338, and sub-question 5 340. In this case, sub-question 2 334 and sub-question 3 336 are concurrent sub-requests 345, e.g., that can be executed concurrently.

For example, the request planner AI NN agent 320 can determine the ordering of sub-requests in the sequence of sub-requests by representing the sub-requests as a directed acyclic graph (DAG), e.g., the sub-request DAG 345. In particular the request planner AI NN agent 320 can generate data including a set of nodes representing each sub-request and a set of edges that each connect a pair of nodes according to the ordering of the sub-requests in the sequence. In the particular example depicted, each node in the DAG 345 is labelled with a numeral illustrating the sub-question that corresponds with the node, e.g., sub-question 1 332 corresponds with the node labelled 1, sub-question 2 334 corresponds with the node labelled 2, sub-question 3 336 corresponds with the node labeled 3 334, etc.

In particular, in the graph 345, the directionality of an edge can represent the order of execution from a first node corresponding with a first request in the sequence to a second node corresponding with a second request in the sequence, e.g., to represent that the second request depends on the completion of the first request. For example, sub-question 2 334 (represented by node 2), sub-question 3 336 (represented by node 3), and sub-question 4 338 (represented by node 4) each depend on the completion of sub-question 1 332 (represented by node 1), e.g., the completion of the corresponding response generation for sub-question 1 332. As another example, sub-question 5 340 (represented by node 5) depends on the completion of sub-question 4 338 (node 4).

The system can also represent the concurrent requests in the DAG 345 as nodes that do not have incoming edges from other nodes that are meant to be executed in parallel. For example, sub-question 2 334 (represented by node 2) and sub-question 3 336 (represented by node 3) are meant to be executed in parallel in the graph 345.

In the particular example depicted, the system can process each of the sub-requests 330 using a classifier model 350 to assign a particular retriever AI NN agent to each sub-request. The classifier model 350 can have any appropriate machine learning architecture, e.g., a random forest, a support vector machine, a decision tree, logistic regression model, or a neural network, that can be configured to process a sub-request to generate a classification specifying which retriever AI NN agent should be used for processing the sub-request. In the case that the classifier model 250 is a neural network, the classifier model 350 can have any appropriate number of neural network layers (e.g., 1 layer, 5 layers, or 10 layers) of any appropriate type (e.g., fully-connected layers, attention layers, convolutional layers, etc.) connected in any appropriate configuration (e.g., as a linear sequence of layers, or as a directed graph of layers).

For example, the system, or another system, can train the classifier model 350 on a set of training examples that include (i) a training input sub-request and (ii) a ground truth assigned retriever AI NN agent by a machine learning training technique to optimize an objective function. The objective function can measure, for each training example, a discrepancy between: (i) the ground truth assigned agent specified by the training example, and (ii) the predicted agent generated by the classifier model 350 by processing the training input of the training example. For example, the objective function can measure the discrepancy in any appropriate way, e.g., using a cross-entropy loss or a mean squared error loss. The machine learning training technique can be any technique appropriate for training the classification model 350. For instance, for a classifier model 350 implemented as a neural network, the model can be trained by calculating and backpropagating gradients of an objective function to update parameter values of the model, e.g., using the update rule of any appropriate gradient descent optimization algorithm, e.g., RMSprop or Adam.

In this case, the system can process each of the sub-requests 330 using the classifier model to determine that agent 1 362 should process sub-question 1 332 and sub-question 2 334, and that agent 2 364 should process sub-question 3 336, sub-question 4 338, and sub-question 5 340. The system can then provide the inputs to agent 1 362 and agent 2 364 in accordance with the ordering of the DAG 345, e.g., by first providing the input for sub-question 1 332 to agent 1 362 and obtaining the corresponding response to sub-question 1 332 before concurrently providing the respective inputs for sub-question 2 334 to agent 1 362 and sub-question 3 336 to agent 2 364, which can be executed in parallel. The system can obtain the corresponding responses to sub-questions 2 and 3 334, 336 and then provide the input for sub-question 4 338 to agent 2 364. Finally, the system can obtain the corresponding response to sub-question 4 and then provide the input for sub-question 5 340 to agent 2 364.

Figure 4:
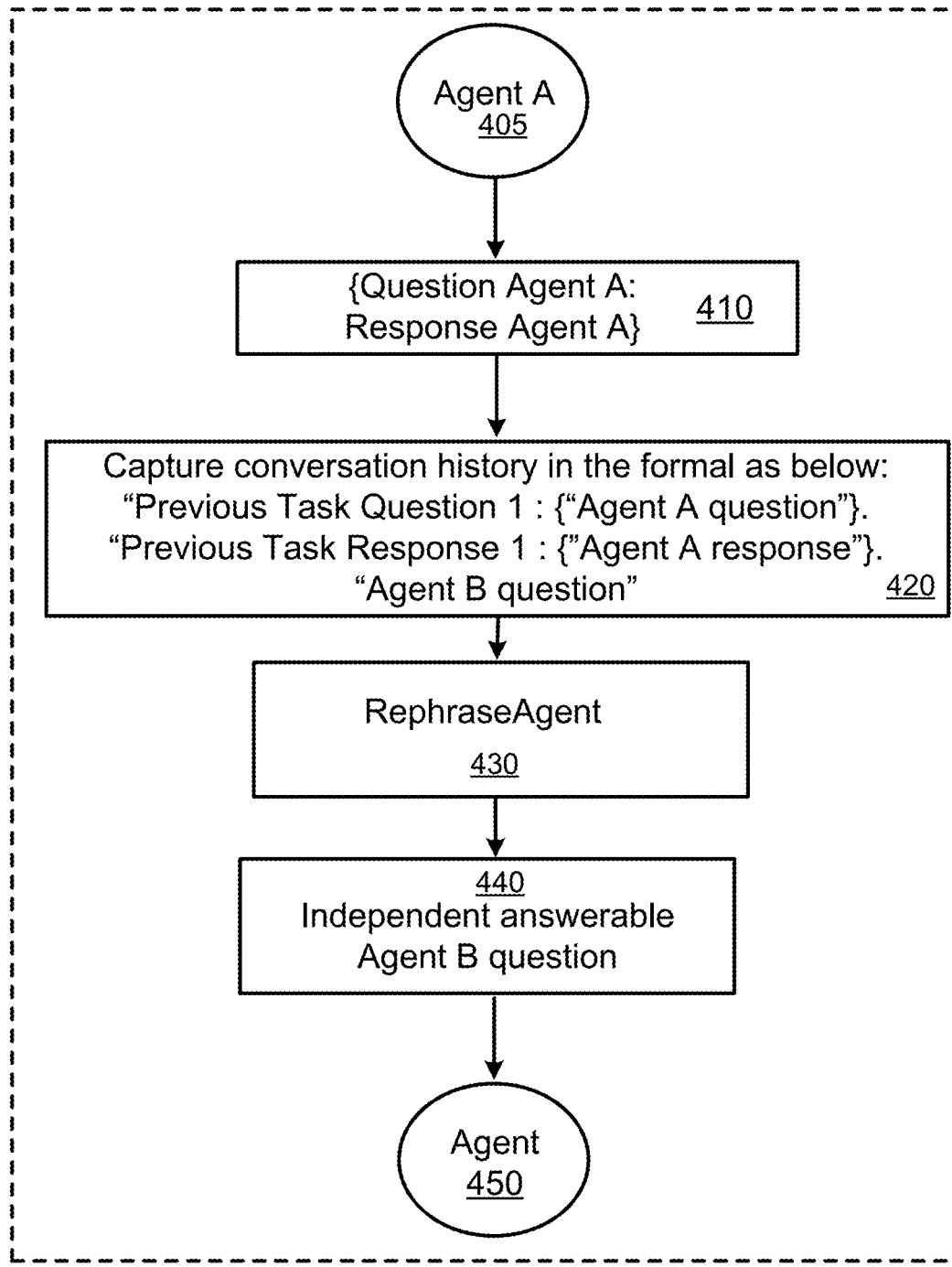
FIG. 4 illustrates an example agent-to-agent communication protocol that allows for rephrasing a sub-request based on previously executed sub-requests.

Each time a dependency exists between a sub-request and a previous sub-request in the sequence of sub-requests, the system can rephrase the sub-request, e.g., to reflect information obtained in the corresponding response for the previous-sub-request. FIG. 4 illustrates an example agent-to-agent (A2A) communication protocol that allows for rephrasing a sub-request based on previously executed sub-requests.

In particular, the system can maintain a record of the conversation history, e.g., a running log 420, of each obtained corresponding response for a particular input request as the sub-requests based on the input request are executed. For example, after the system obtains a recently generated response, e.g., the response 410 from retriever AI NN agent A 405, the system can add the response 410 to the running log 420, e.g., by appending the response to the end of the log 420. The system can then include the obtained responses in the log 420 as input to an additional agent, e.g., to provide context based on completed sub-requests in the execution plan. In particular, the system can process the running log 420 using an additional rephrase AI NN agent 430 to generate an independently answerable sub-request 440 for an additional agent, e.g., retriever AI NN agent B, that incorporates relevant information from the conversation history. As an example, rephrasing the sub-requests based on the context provided by the log 420 can significantly improve the accuracy of the generated corresponding response.

As an example, the system can use the A2A communication protocol to rephrase one or more corresponding responses from previously executed sub-requests in the sequence of sub-requests in the case of a dependency between the previously executed sub-requests and a next sub-request to be executed. In particular, rephrasing the sub-request based on the corresponding responses in the log 420 ensures that informational dependencies between sub-requests according to the ordering of the sequence of sub-requests are reflected in the execution of dependent sub-requests.

As another example, the system can use the A2A communication protocol to re-execute a particular sub-request. In some cases, the system can evaluate the corresponding responses based on a criterion, e.g., an answerability criterion, a detail criterion, a vagueness criterion, etc. In particular, the system can process the sub-request and the corresponding response using an evaluator AI NN agent. For example, the evaluator AI NN agent can be implemented as an LLM, and the system can process the sub-request and the corresponding response with an instruction to determine whether the corresponding response sufficiently answers the sub-request.

In the case that the corresponding response obtained for a sub-request does not satisfy the criterion, the system can use the log 420 to re-execute the sub-request, e.g., using the same retriever AI NN agent or a different retriever AI NN agent. In particular, the system can provide the log 420 to the AI NN agent as input to re-execute the sub-request. In other cases, the system can re-execute the sub-request, e.g., without using the log 420. As an example, the system can re-execute the sub-request to generate a different response for comparison with the first generated response.

While the system allows for re-executing a sub-request, the system can prevent against the creation of infinite re-execution loops. Once the system has started executing the request execution plan, the system can prevent the creation of any infinite communication cycles between the AI NN agents. For example, the system can maintain a count of the number of times that a sub-request has been answered. In the case that the number of times exceeds a threshold criterion, e.g., a configured re-execution maximum value, the system can abort the execution of the sub-request and provide an indication of the lack of the corresponding response to the synthesizer AI NN agent. Additionally, after the request planner AI NN agent has generated the request execution plan and assigned the sub-requests to the retriever AI NN agents, the system can prevent the request planner AI NN agent from receiving any transmission from the retriever AI NN agents, e.g., to ensure that executing the request execution plan does not result in an infinite cycle between the request planner AI NN agent and any retriever AI NN agents indicating an error after failing to generate a corresponding response.

Figure 5:
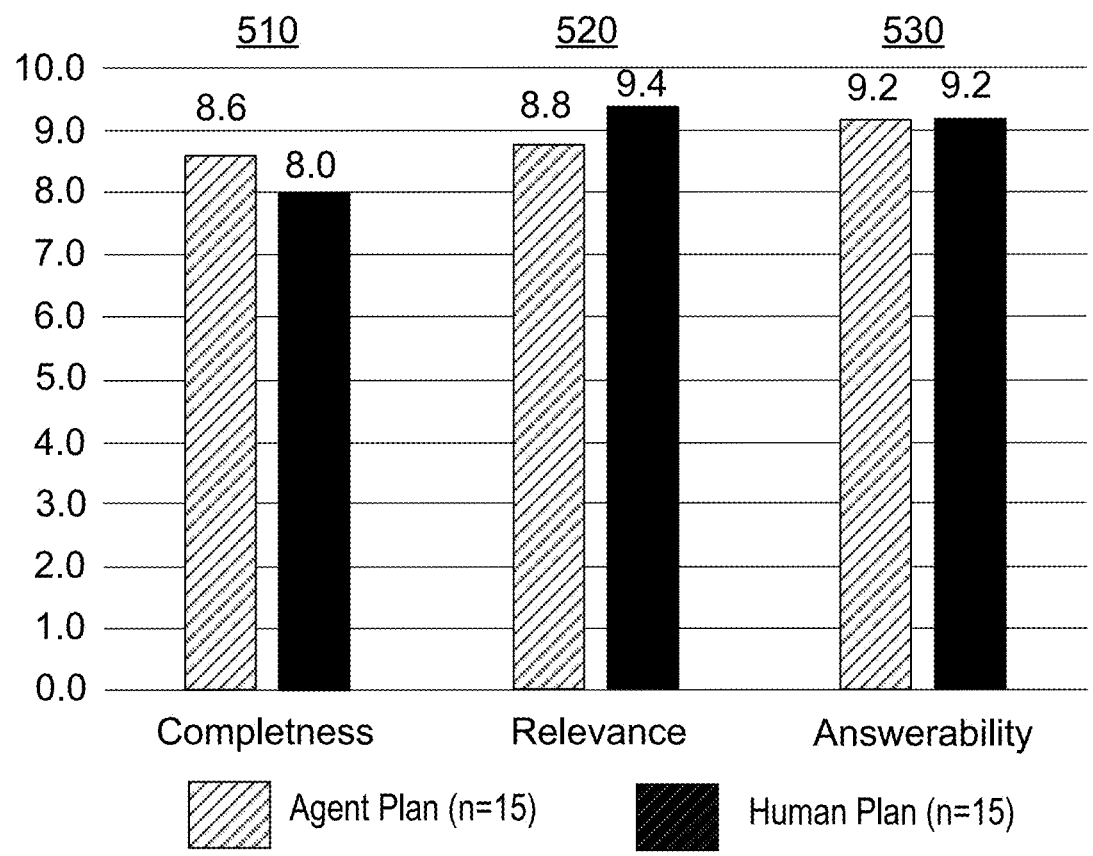
FIG. 5 depicts an example evaluation of overall responses generated using the multi-agent data asset synthesis system of FIG. 1 compared to human-generated responses.

FIG. 5 depicts a results comparison of overall responses generated using the multi-agent data asset synthesis system of FIG. 1 compared to human-generated responses for a set of 15 multi-asset synthesis requests involving different data assets from a variety of siloed data repositories.

In this case, the multi-asset synthesis requests are requests for drug development, manufacture, and distribution. As an example, a request from the set of requests can include the prompt "I'm developing a market entry strategy for an innovative insulin treatment in the UK and Italy. Could you provide an analysis of the competitive landscape, regulatory requirements, and key patient needs within this market?"

In the particular example depicted, the multi-agent asset synthesis system 200 of FIG. 2 was used to generate reports as the overall response for the set of 15 multi-asset synthesis requests, which were compared to reports generated using a team of data scientists, consultants, and subject matter experts. In this case, each of the AI NN agents in the system 200, e.g., the request refiner AI NN agent 214, the request planner AI NN agent 220, the retriever AI NN agents 240 and 250, and the synthesizer AI NN agent 270 were implemented using LLMs.

The bar graph 500 includes the results of the blind comparison for each pairing of human-generated and system-generated report for a respective request from the set of 15 multi-asset synthesis requests. In particular, each pairing of reports was presented to the team of human reviewers to compare without any indication of the origin of the report. Reviewers were asked to rate the reports on a scale from one to 10 based on completeness, e.g., whether the report answered all aspects of the initial request, relevance, e.g., whether the corresponding responses for sub-requests were relevant to answering the initial request, and answerability, e.g., whether the sub-request can be answered at all. The results comparison for each metric are shown in the bars 510, 520, and 530, respectively.

More specifically, the bar graph 500 demonstrates the robustness of the system-generated reports. While the human plans and the system-generated plans performed similarly across all metrics and the human plan outperformed the system-generated plan in terms of relevance, the system-generated plan was indicated to be more complete. The system-generated plans achieve high performance, e.g., averaging 8.9 out of 10 across the metrics, indicating the usefulness of the system-generated reports, which were notably generated in a fraction of the time of the human-generated ones, e.g., 15 minutes on average for each system-generated report compared to about 4 weeks for the human-generated ones.

Figure 6:
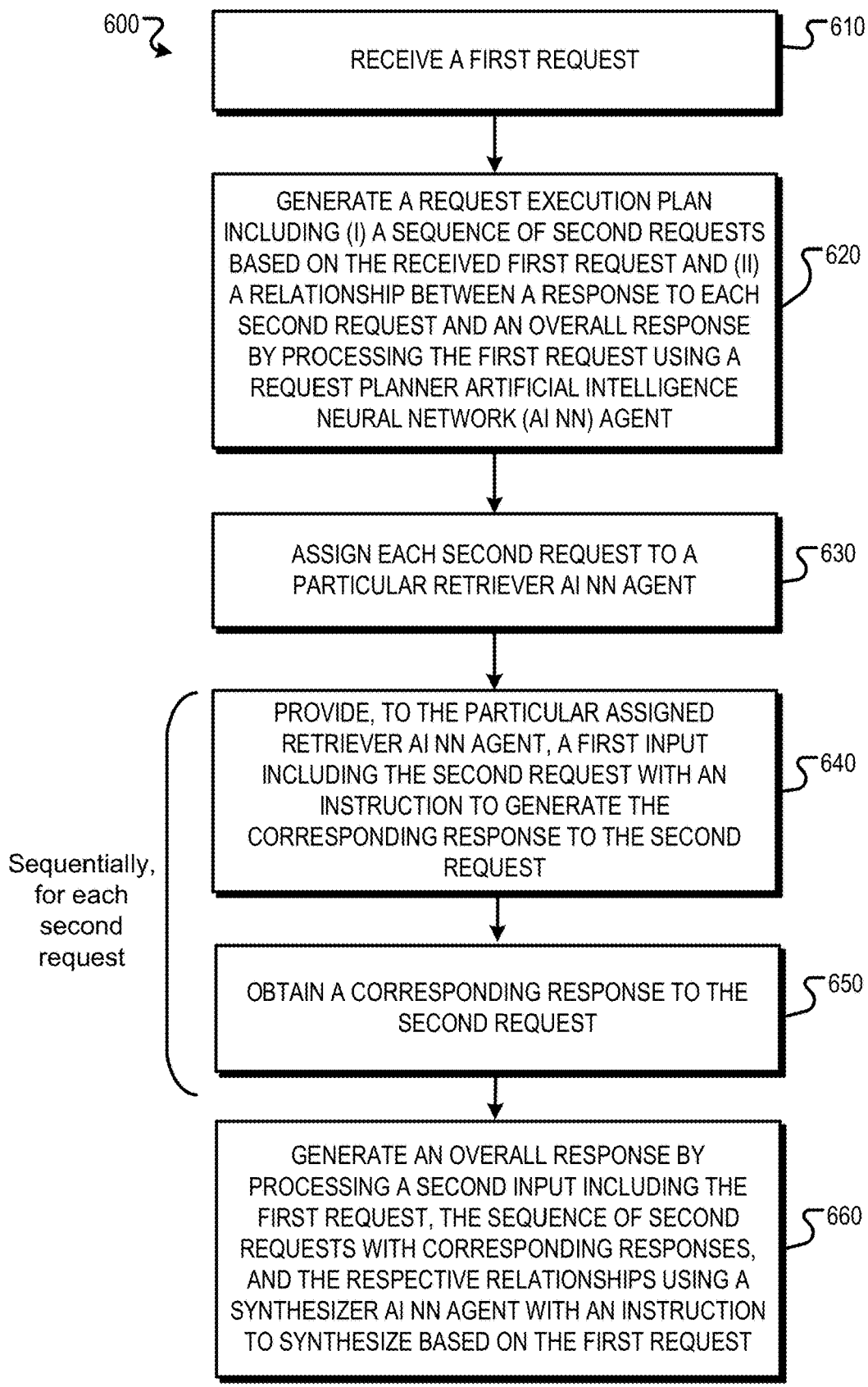
FIG. 6 is a flow diagram of an example process for generating and executing a request execution plan to generate an overall response to a received request.

FIG. 6 is a flow diagram of an example process 600 for generating and executing a request execution plan to generate an overall response to a received request. For convenience, the process 600 will be described as being performed by a system of one or more computers located in one or more locations. For example, a multi-agent data asset synthesis system, e.g., the multi-agent data asset synthesis system 100 of FIG. 1, appropriately programmed in accordance with this specification, can perform the process 600.

The system can receive a first request (step 610). In particular, the system can receive the first request, e.g., from a user or from another system. For example, the first request can specify a multi-asset data synthesis task, e.g., a complex task that involves synthesizing data from a variety of data sources.

The system can generate a request execution plan for the received first request (step 620). In particular, the request execution plan can include (i) a sequence of second requests based on a received first request and (ii) a respective indicator of a relationship between a corresponding response to each second request and an overall response to the first request by processing the first request using a request planner artificial intelligence neural network (AI NN) agent.

In this case, each second request is a sub-request and the respective indicator of the relationship between the corresponding response to the overall response reflects any interdependencies between responses, e.g., how the response to a particular sub-request can depend on a response to a previous sub-request. As an example, the system can first determine whether the first request satisfies a request specification criterion indicative of the specificity and detail of the first request. In the case that the request does not satisfy the request specification criterion, the system can use a refiner AI NN agent to prompt a user that submitted the first request to provide sufficient specificity and detail for the first request, e.g., by prompting a user to clarify an aspect of the first request.

For example, the system can generate the sequence of second requests based on available data repositories, e.g., which contain siloed data assets. In this context, available data repositories are data repositories which a user of the system, e.g., that submitted the first request, has permissions to access.

As an example, a second request can include a data retrieval strategy task and generation task for one or more data assets maintained in a particular data repository. For example, a data retrieval strategy task can be a retrieval task tailored to either structured data, e.g., database tables, or unstructured data, e.g., documents, emails, images, etc. in a data repository. In particular, the system can obtain respective metadata for each data repository, e.g., which characterizes the data in the data repository, and can process an input including the first request, the respective metadata for each data repository, and a set of one or more example second requests using the request planner AI NN agent with an instruction to generate the sequence of second requests and corresponding respective indicators by decomposing the first request according to the respective metadata for each data repository.

The system can then assign each second request to a particular retriever AI NN agent (step 630). In particular, the system can process the second request using an agent classifier model to assign the second request to a particular retriever AI NN agent. For example, the system can assign the second request to the particular retriever AI NN agent in accordance with metadata corresponding with a particular data repository which a user of the system, e.g., that submitted the first request, has permissions to access.

More specifically, the particular assigned retriever AI NN agent can be selected from a set of retriever AI NN agents that have each been finetuned on at least a respective data retrieval strategy task for a respective data repository using data in the respective data repository. For example, the set of retriever AI NN agents can correspond with a configuration of a second system that submitted the request, e.g., the set of retriever AI NN agents can be the set of retriever AI NN agents available to the second system through the configuration. In this case, the request planner AI NN agent can process respective metadata for each data repository that has been used to finetune each of the retriever AI NN agents in the set of retriever AI NN agents, e.g., to determine each second request in the sequence of requests.

The system can then sequentially execute the request execution plan, e.g., by performing steps 640-650 for each second request in the sequence of second requests. More specifically, the system can execute each second request consecutively according to the ordering of the sequence of second requests. For example, the request planner AI NN agent can determine the ordering of second requests in the sequence of second requests, e.g., by generating data representing a directed acyclic graph (DAG) including a set of nodes and a set of edges. In this case, each node in the set of nodes represents a second request in the sequence of second requests, and each edge in the set of edges connects a respective pair of nodes in the DAG and represents an ordering between a first request and a second request corresponding to a respective pair of nodes, e.g., an edge from a first node corresponding with the first request to a second node corresponding with the second request represents that the second request depends on the completion of the first request.

In some cases, the request execution plan further includes (iii) one or more third requests, e.g., that can be executed in parallel concurrently with at least one second request in the sequence of second requests. In particular, the request planner NN AI agent can additionally determine one or more third requests and (iv) a respective indicator of a relationship between a corresponding response for each third request and an overall response to the first request. For example, the system can represent the third requests in the DAG as nodes that do not have incoming edges from other nodes that are meant to be executed in parallel.

In the case that the request execution plan includes one or more third requests, the system can execute the third requests in parallel with at least one second request of the sequence of second requests, e.g., using the same type of particular retriever AI NN agent assigned to the at least one of the one or more second requests or a different retriever AI NN agent.

For each second request, the system can provide a first input including the second request to the particular assigned retriever AI NN agent with an instruction to generate the corresponding response to the second request (step 640). As an example, the system can provide the first input to the particular retriever AI NN agent by processing the first input using the retriever AI NN agent, e.g., in the case that the retriever AI NN agent is included in the system. As another example, the system can submit the first input to a second system for processing using the retriever AI NN agent.

In some cases, the second request can also include the metadata for the respective data repository, e.g., in the case that the particular retriever AI neural network agent generates one or more variations of the second request that are each used for the respective data retrieval task. In particular, the particular retriever AI neural network agent that is assigned the second request can generate one or more variations of the second request that are each used for the respective data retrieval task, e.g., in order to retrieve a broader range of relevant information using a particular data repository. As an example, the system can rephrase the second request using the one or more obtained corresponding responses generated for any previous second requests, e.g., by processing the second request and the one or more obtained corresponding responses using a rephrasing AI NN agent to generate a rephrased second request. In this case, the system can replace the second request and the one or more obtained corresponding responses in the first input with the rephrased second request.

As an example, the particular retriever AI NN agent can be a structured data retriever AI NN agent that generates the corresponding response to the second request using a relational table including one or more rows and a set of columns. In particular, the structured data retriever AI NN agent can generate the corresponding response by identifying a relevant subset of the set of columns using the second request, querying the respective data repository to generate a view of the table corresponding with the relevant subset of the set of columns, and can identify one or more rows of the view of the table relevant to answering the second request. The view of the table can be considered to be a temporary view of the table, which can reduce the computational processing power needed to retrieve the relevant subset of the set of columns, e.g., by allowing for the reuse of the temporary table as an intermediate result.

As another example, the particular retriever AI NN agent can be an unstructured data retriever AI NN agent. In particular, the unstructured data retriever AI NN agent can generate the corresponding response to the second request by generating a request embedding of the second request by processing the request using an embedding neural network and using the request embedding to identify one or more documents in a respective data repository. In this case, the system can determine respective measures of similarity between the request embedding and document embeddings, e.g., that were generated by processing each of the documents using the embedding neural network, and selecting N documents from the respective data repository using the measures of similarity. As an example, the system can select the N most similar documents from the data repository, e.g., by ranking the documents based on the respective measures of similarity. In some cases, the system can use a number of unstructured data retriever AI NN agents to each select N documents from the respective data repository in accordance with a respective data retrieval strategy. In this case, the system can aggregate each of the selected N documents, can rank the aggregated selected documents based on the measures of similarity, and can select N documents from the ranked aggregated selected documents.

The system can then obtain a corresponding response to the second request (step 650), for each second request. In some cases, the system can maintain a record of the obtained corresponding responses for each of the one or more second requests. In this case, the first input for a next second request in the sequence of second requests can additionally include one or more obtained corresponding responses generated for any previous second requests in the sequence of second requests. As an example, in response to an indication that the corresponding response does not satisfy a criterion, the system can obtain the record of the one or more obtained corresponding responses, and can provide the record of the one or more obtained corresponding responses to the particular retriever AI NN agent.

The system can then generate an overall response by processing a second input including the first request, the sequence of second requests with respective corresponding responses, and the respective relationships between the respective corresponding responses and the overall response using a synthesizer AI NN agent with an instruction to synthesize the respective corresponding responses based on the first request (step 660). In the case that the request execution plan includes one or more third requests, the second input can additionally include the responses to the one or more third requests and the additional respective indicator of the relationship between the corresponding responses for each third request and the overall response to the first request.

For example, the system can generate a report as the overall response that includes citations indicating a reference to data in the respective data repository that was used to generate the corresponding response used to generate content in the portion of the report corresponding with the citation, the particular retriever AI NN agent and sub-request that resulted in the content, or both. In some cases, the system can further include an instruction to the synthesizer AI NN agent to synthesize the respective corresponding responses by prioritizing the portions of corresponding responses with citations to data that satisfies a data importance criterion. As an example, the data importance criterion can relate to a measure of credibility of the data, e.g., based on a journal that the data was published in, the number of citations to the publication including the data, etc.

More specifically, one or more of the request planner AI NN agent, the set of retriever AI NN agents, or the synthesizer AI NN agent can be implemented as language processing neural network agents, e.g., large language model (LLM) agents. In particular, each language processing neural network agent can include a set of parameter values, e.g., that can be updated through either training, finetuning, or both. In this case, each AI NN agent of the language processing neural network agents can have been finetuned using reinforcement learning. For example, the system, or another system, can receive a first reward for the output of the AI NN agent, can receive a second reward for the overall response generated using the output of the AI NN agent, and can update one or more of the parameter values of the set of parameter values of the AI NN agent based at least on the first and second rewards. In particular, the system, or the other system, can obtain the first reward and the second reward from a user, e.g., as feedback for the output of the AI NN agent and as feedback for the overall response.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, or a Jax framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   receiving a first request from a user of a computing-device;
   generating, by a computer system, a request execution plan comprising (i) a sequence of second requests based on the received first request and (ii) a respective indicator of a relationship between a corresponding response for each second request of second requests in the sequence of second requests and an overall response to the first request by processing the first request using a request planner artificial intelligence (AI) neural network agent;
   assigning, by the computer system, said each second request to a particular retriever AI neural network agent implemented on the computer system based on the sequence of second requests;

querying one or more data repositories of the computer system using the particular retriever AI neural network agent assigned to said each second request,
wherein the querying comprises, sequentially, for said each second request of second requests in the sequence of second requests:
providing, from the computer system, to the assigned particular retriever AI neural network agent, a first input comprising the second request with an instruction to generate the corresponding response to the second request, wherein the assigned particular retriever AI neural network agent has been assigned in accordance with metadata corresponding with a particular data repository of the one or more data repositories, wherein the particular retriever AI neural network agent is selected from a set of retriever AI neural network agents that have been finetuned by updating one or more parameter values of the retriever AI neural network agents based on at least a respective data retrieval strategy task for a respective data repository using data in the respective data repository; and
obtaining the corresponding response to the second request from the particular retriever AI neural network agent, wherein the corresponding response comprises citations to data retrieved from the particular data repository to generate the corresponding response; and
generating, by the computer system, the overall response to the first request by processing a second input comprising the first request, the sequence of second requests with the corresponding responses, and the respective indicators of the relationships between the corresponding responses and the overall response using a synthesizer AI neural network agent with an instruction stored in the computer system to synthesize the corresponding responses based on the first request, wherein the overall response comprises the citations of the corresponding responses to present, to the user of the computing-device, a reference to the data retrieved from the particular data repository, wherein the second input is different from the first input.

2. The method of claim 1, wherein the request execution plan further comprises (iii) one or more third requests and (iv) an additional respective indicator of a relationship between a corresponding response for each third request and an overall response to the first request, wherein the one or more third requests can be executed in parallel with at least one second request of the sequence of second requests, and wherein the second input further comprises responses to the one or more third requests and additional respective indicators of the relationships between the corresponding responses for each third request and the overall response to the first request.

3. The method of claim 1, wherein generating the request execution plan using a request planner AI neural network agent further comprises: obtaining respective metadata for each data repository that has been used to finetune a retriever AI neural network agent in the set of retriever AI neural network agents; processing a third input comprising the first request, the respective metadata for each data repository, and a set of one or more second requests using the request planner AI neural network agent with an instruction to generate the sequence of second requests and corresponding respective indicators by decomposing the first request according to the respective metadata for each data repository.

4. The method of claim 1, further comprising determining an order of execution for the request execution plan by generating data representing a directed acyclic graph (DAG), wherein the directed acyclic graph comprises a set of nodes and a set of edges, and wherein: each node in the set of nodes represents a second request in the sequence of second requests; and each edge in the set of edges connects a respective pair of nodes in the DAG and represents an ordering between a first request and a second request corresponding to the respective pair of nodes.

5. The method of claim 1, wherein providing the first input to the particular retriever AI neural network agent comprises: processing the first input using the retriever AI neural network agent; or submitting the first input to a second system for processing using the retriever AI neural network agent.

6. The method of claim 1, further comprising, maintaining a record of obtained corresponding responses for each second request of the one or more second requests.

7. The method of claim 6, wherein the first input further comprises one or more obtained corresponding responses generated for any previous second requests in the sequence of second requests.

8. The method of claim 7, further comprising rephrasing the second request using the one or more obtained corresponding responses generated for any previous second requests, wherein rephrasing comprises: processing the second request and the one or more obtained corresponding responses using a rephrasing AI neural network agent to generate a rephrased second request, wherein the rephrased second request replaces the second request and the one or more obtained corresponding responses in the first input.

9. The method of claim 7, further comprising: in response to an indication that the corresponding response does not satisfy a criterion, obtaining the record of the one or more obtained corresponding responses; and providing the record of the one or more obtained corresponding responses to the particular retriever AI neural network agent.

10. The method of claim 1, wherein receiving the first request further comprises: determining whether the first request satisfies a request specification criterion, wherein the request specification criterion is indicative of specificity and detail of the first request; and in response to determining that the first request does not satisfy the request specification criterion, using a refiner AI neural network agent to prompt a user that submitted the first request to provide sufficient specificity and detail for the first request.

11. The method of claim 1, wherein the particular retriever AI neural network agent generates one or more variations of the second request that are used for the respective data retrieval strategy task.

12. The method of claim 1, wherein the particular retriever AI neural network agent is a structured data retriever AI neural network agent that generates the corresponding response using a relational table comprising one or more rows and a set of columns through operations comprising: identifying a relevant subset of the set of columns using the second request; querying the respective data repository to generate a view of the table corresponding with the relevant subset of the set of columns; and identifying one or more rows of the view of the table relevant to answering the second request.

13. The method of claim 1, wherein the particular retriever AI neural network agent is an unstructured data retriever AI neural network agent that generates the corresponding response through operations comprising:

generating a request embedding of the second request by processing the request using an embedding neural network;

determining respective measures of similarity between the request embedding and document embeddings in the respective data repository, wherein the document embeddings have been generated using the embedding neural network; and selecting documents from the respective data repository using the measures of similarity.

14. The method of claim 13, further comprising:

using a plurality of unstructured data retriever AI neural network agents to select documents from the respective data repository in accordance with a respective data retrieval strategy; and aggregating each selected document of the selected documents into a plurality of selected documents; and ranking the plurality of selected documents; and selecting documents from the ranked plurality of selected documents.

15. The method of claim 1, wherein generating the overall response comprises generating a report comprising citations using the synthesizer AI neural network agent, wherein each citation indicates a reference to data in the respective data repository that was used to generate the corresponding response and used to generate content in a portion of the report corresponding with the citation.

16. The method of claim 15, wherein the instruction to synthesize the respective corresponding responses based on the first request further comprises an instruction to prioritize portions of corresponding responses with citations to data that satisfies a data importance criterion.

17. The method of claim 1, wherein one or more of request planner AI neural network agent, the set of retriever AI neural network agents, or the synthesizer AI neural network agent are language processing neural network agents comprising a set of parameter values.

18. The method of claim 17, wherein each AI neural network agent of the language processing neural network agents has been finetuned through operations comprising:

receiving a first reward for output of the AI neural network agent;

receiving a second reward for the overall response generated using the output of the AI neural network agent; and updating one or more of the parameter values of a set of parameter values of the AI neural network agent based at least on the first and second rewards.

19. A system comprising:

a computer system comprising: a memory configured to store instructions; and a processor to execute the instructions to perform operations comprising:

receiving a first request from a user of a computing-device;

generating a request execution plan comprising (i) a sequence of second requests based on the received first request and (ii) a respective indicator of a relationship between a corresponding response for each second request of second requests in the sequence of second requests and an overall response to the first request by processing the first request using a request planner artificial intelligence (AI) neural network agent;

assigning said each second request to a particular retriever AI neural network agent implemented on the computer system based on the sequence of second requests;

querying one or more data repositories of the computer system using the particular retriever AI neural network agent assigned to said each second request, wherein the querying comprises, sequentially, for said each second request of second requests in the sequence of second requests:

providing, from the computer system, to the assigned particular retriever AI neural network agent, a first input comprising the second request with an instruction to generate the corresponding response to the second request, wherein the assigned particular retriever AI neural network agent has been assigned in accordance with metadata corresponding with a particular data repository of the one or more data repositories, wherein the particular retriever AI neural network agent is selected from a set of retriever AI neural network agents that have been finetuned by updating one or more parameter values of the retriever AI neural network agents based on at least a respective data retrieval strategy task for a respective data repository using data in the respective data repository; and obtaining the corresponding response to the second request from the particular retriever AI neural network agent, wherein the corresponding response comprises citations to data retrieved from the particular data repository to generate the corresponding response; and generating the overall response to the first request by processing a second input comprising the first request, the sequence of second requests with the corresponding responses, and the respective indicators of the relationships between the corresponding responses and the overall response using a synthesizer AI neural network agent with an instruction stored in the computer system to synthesize the corresponding responses based on the first request, wherein the overall response comprises the citations of the corresponding responses to present, to the user of the computing-device, a reference to the data retrieved from the particular data repository, wherein the second input is different from the first input.

20. One or more non-transitory computer readable media storing instructions that are executable by processing device, and upon execution cause the processing device to perform operations comprising:

receiving a first request from a user of a computing-device;

generating a request execution plan comprising (i) a sequence of second requests based on the received first request and (ii) a respective indicator of a relationship between a corresponding response for each second request of second requests in the sequence of second requests and an overall response to the first request by processing the first request using a request planner artificial intelligence (AI) neural network agent;

assigning said each second request to a particular retriever AI neural network agent implemented on a computer system based on the sequence of second requests;

querying one or more data repositories of the computer system using the particular retriever AI neural network agent assigned to said each second request, wherein the querying comprises, sequentially, for said each second request of second requests in the sequence of second requests:

providing, from the computer system, to the assigned particular retriever AI neural network agent, a first input comprising the second request with an instruction to generate the corresponding response to the second request, wherein the assigned particular retriever AI neural network agent has been assigned in accordance with metadata corresponding with a particular data repository of the one or more data repositories, wherein the particular retriever AI neural network agent is selected from a set of retriever AI neural network agents that have been finetuned by updating one or more parameter values of the retriever AI neural network agents based on at least a respective data retrieval strategy task for a respective data repository using data in the respective data repository; and obtaining the corresponding response to the second request from the particular retriever AI neural network agent, wherein the corresponding response comprises citations to data retrieved from the particular data repository to generate the corresponding response; and generating the overall response to the first request by processing a second input comprising the first request, the sequence of second requests with the corresponding responses, and the respective indicators of the relationships between the corresponding responses and the overall response using a synthesizer AI neural network agent with an instruction stored in the computer system to synthesize the corresponding responses based on the first request, wherein the overall response comprises the citations of the corresponding responses to present, to the user of the computing-device, a reference to the data retrieved from the particular data repository, wherein the second input is different from the first input.

* * * * *

UNITED STATES PATENT AND TRADEMARK OFFICE
CERTIFICATE OF CORRECTION

| | | |
|---|---|---|
| PATENT NO. | : 12,321,351 B1 | Page 1 of 1 |
| APPLICATION NO. | : 19/001865 | |
| DATED | : June 3, 2025 | |
| INVENTOR(S) | : Sunil Kumar Singh et al. | |

It is certified that error appears in the above-identified patent and that said Letters Patent is hereby corrected as shown below:

In the Claims

Column 24, Line 64, delete "said".

Column 25, Line 3, delete "said";
Line 4, delete "said".

Column 26, Line 20, delete "the".

Column 27, Line 65, delete "said".

Column 28, Line 3, delete "said";
Line 4, delete "said";
Line 44, after the phrase executable by insert -- a --;
Line 57, delete "said";
Line 62, delete "said";
Line 63, delete "said".

Signed and Sealed this
Sixteenth Day of December, 2025

John A. Squires
*Director of the United States Patent and Trademark Office*